(12) United States Patent
Cloud et al.

(10) Patent No.: US 11,489,938 B2
(45) Date of Patent: Nov. 1, 2022

(54) METHOD AND SYSTEM FOR PROVIDING MEDIA CONTENT TO A CLIENT

(71) Applicants: DOLBY LABORATORIES LICENSING CORPORATION, San Francisco, CA (US); DOLBY INTERNATIONAL AB, Amsterdam Zuidoost (NL)

(72) Inventors: Jason Michael Cloud, Clayton, CA (US); Jeffrey Riedmiller, Novato, CA (US); Kristofer Kjoerling, Solna (SE); Janusz Klejsa, Solna (SE)

(73) Assignee: DOLBY INTERNATIONAL AB, Amsterdam (NL)

( * ) Notice: Subject to any disclaimer, the term of this patent is extended or adjusted under 35 U.S.C. 154(b) by 195 days.

(21) Appl. No.: 16/634,568

(22) PCT Filed: Jul. 26, 2018

(86) PCT No.: PCT/US2018/043944
§ 371 (c)(1),
(2) Date: Jan. 27, 2020

(87) PCT Pub. No.: WO2019/023488
PCT Pub. Date: Jan. 31, 2019

(65) Prior Publication Data
US 2020/0275171 A1 Aug. 27, 2020

Related U.S. Application Data

(60) Provisional application No. 62/695,947, filed on Jul. 10, 2018, provisional application No. 62/538,093, filed on Jul. 28, 2017.

(51) Int. Cl.
*H04L 67/565* (2022.01)
*H04N 21/2343* (2011.01)
(Continued)

(52) U.S. Cl.
CPC ........... *H04L 67/565* (2022.05); *H04L 65/60* (2013.01); *H04L 67/568* (2022.05);
(Continued)

(58) Field of Classification Search
CPC ......... H04N 21/8456; H04N 21/23439; H04N 21/2402; H04N 21/2662; H04N 21/64738;
(Continued)

(56) References Cited

U.S. PATENT DOCUMENTS 6,877,134 B1 4/2005 Fuller
7,716,551 B2 5/2010 Barkley
(Continued)

OTHER PUBLICATIONS

European Patent Office, "EP Written Opinion", dated Oct. 30, 2020, EP 18837873.1.*
(Continued)

*Primary Examiner* — Ramy M Osman

(57) ABSTRACT

A method for providing media content within a media distribution network. The method comprises transforming source media content into an interim format, thereby providing transformed content. Furthermore, the method comprises storing the transformed content on at least one core storage unit. In addition, the method comprises receiving a request for the source media content from a client. The method further comprises encoding the transformed content or intermediate coded content derived therefrom into encoded content suitable for transmission over a core network and/or an edge network, as well as sending the encoded content via the core network and/or the edge network to the client.

27 Claims, 5 Drawing Sheets

(51) Int. Cl.
  *H04N 21/24* (2011.01)
  *H04N 21/2662* (2011.01)
  *H04N 21/845* (2011.01)
  *H04L 65/60* (2022.01)
  *H04L 67/568* (2022.01)

(52) U.S. Cl.
  CPC ... *H04N 21/23439* (2013.01); *H04N 21/2402* (2013.01); *H04N 21/2662* (2013.01); *H04N 21/8456* (2013.01)

(58) Field of Classification Search
  CPC ......... H04N 21/64784; H04N 21/8106; H04N 21/234309; H04L 65/60; H04L 67/2823; H04L 67/2842; H04L 67/565; H04L 67/568; G10L 19/173; G10L 19/24
  See application file for complete search history.

(56) References Cited

U.S. PATENT DOCUMENTS

| | | | |
|---|---|---|---|
| 8,259,989 B2 | 9/2012 | Sirivara | |
| 8,626,876 B1* | 1/2014 | Kokal | H04L 67/06 709/219 |
| 8,711,929 B2 | 4/2014 | Swenson | |
| 9,088,634 B1* | 7/2015 | Corley | H04L 65/756 |
| 9,357,272 B2 | 5/2016 | Oyman | |
| 9,502,075 B2 | 11/2016 | Yogeshwar | |
| 9,609,336 B2 | 3/2017 | Topiwala | |
| 10,742,699 B1* | 8/2020 | Shen | H04L 65/4084 |
| 11,038,942 B2* | 6/2021 | Nielsen | H04N 21/8456 |
| 11,064,230 B2* | 7/2021 | Nielsen | G06F 16/9574 |
| 2003/0135411 A1* | 7/2003 | Ushiki | H04L 63/145 709/246 |
| 2005/0180578 A1 | 8/2005 | Cho | |
| 2008/0181298 A1 | 7/2008 | Shi | |
| 2011/0202641 A1 | 8/2011 | Kahn | |
| 2011/0274026 A1* | 11/2011 | Huang | H04W 72/121 370/312 |
| 2012/0254456 A1* | 10/2012 | Visharam | H04L 65/762 709/231 |
| 2013/0016770 A1 | 1/2013 | Kishigami | |
| 2013/0080185 A1 | 3/2013 | Picard | |
| 2013/0195119 A1 | 8/2013 | Huang | |
| 2013/0308699 A1 | 11/2013 | Musser, Jr. | |
| 2013/0343450 A1* | 12/2013 | Solka | H04N 21/2343 375/240.03 |
| 2014/0023196 A1 | 1/2014 | Pei | |
| 2014/0240591 A1* | 8/2014 | Rajagopalan | H04N 21/4347 348/441 |
| 2015/0100991 A1* | 4/2015 | Risberg | H04L 67/104 725/80 |
| 2015/0222939 A1* | 8/2015 | Gallant | H04L 65/4076 725/9 |
| 2016/0093311 A1 | 3/2016 | Kim | |
| 2016/0197971 A1 | 7/2016 | Cen | |
| 2017/0055007 A1* | 2/2017 | Phillips | H04N 21/2353 |
| 2017/0094009 A1* | 3/2017 | Wistow | H04L 61/4511 |
| 2017/0126852 A1* | 5/2017 | Narasimha | H04L 69/22 |
| 2017/0180905 A1 | 6/2017 | Purnhagen | |
| 2017/0221496 A1 | 8/2017 | Grant | |
| 2020/0275171 A1* | 8/2020 | Cloud | H04N 21/64784 |

OTHER PUBLICATIONS

European Patent Office, "European Search Report", dated Oct. 30, 2020, EP 18837873.*
Abdullah, A. et al. "Conceptual Design of Smart Phone based Public Reporting System for Unordinary Events Occurring in Streams" ICEIC Sep. 2014.
Mehta, T. et al "Survey on Multimedia Transmission Using Network Coding Over Wireless Networks" Nirma University, Dec. 8, 2011, pp. 1-6.
Neevan Ramalingam, et al "Superposition Noisy Network Coding" Cornell University Library, Feb. 23, 2011.

* cited by examiner

METHOD AND SYSTEM FOR PROVIDING MEDIA CONTENT TO A CLIENT

CROSS REFERENCE TO RELATED APPLICATIONS

This application claims priority to U.S. Provisional Application No. 62/538,093, filed Jul. 28, 2018 and U.S. Provisional Application No. 62/695,947, filed Jul. 10, 2018, and are incorporated by reference herein.

TECHNICAL FIELD

The present document relates to the distribution of media content, notably video and/or audio, over a distribution network to one or more clients.

BACKGROUND

The shift towards a flexible, highly configurable network infrastructure driven by the adoption of software defined networking (SDN), the push of caching and compute capabilities further into the networks' edge, as well as the growth of the Internet of Things (IoT) open opportunities to exploit new methods for improving the efficiency and personalization of network and/or cloud distributed, stored and delivered multimedia. However, OTT/network delivered multimedia services are using existing audio and video codecs, which were originally designed for broadcast systems that leverage a one-to-many model, in a manner for which they were not originally designed: unicast transmission, and delivery channels (i.e., networks) where intermediate storage and processing are available. The developments within both the network infrastructure and how multimedia is delivered provide an opportunity to drive a paradigm shift in how multimedia is encoded, stored, distributed, and delivered to the end consumer.

The present document addresses the technical problem of providing an efficient and flexible multimedia capture, storage, distribution and/or delivery system for bi-directional, notably IP-based, network communication channels.

SUMMARY

According to an aspect a method for providing media content within a media distribution network is described. The media distribution network comprises a core network with one or more (core) storage units. Furthermore, the media distribution network comprises at least one edge network interconnecting the one or more core storage units to one or more clients. The method comprises: transforming source media content into an interim format, thereby providing transformed content; storing the transformed content on one or more core storage units; receiving a request for the source media content from a client; encoding the transformed content or intermediate coded content derived therefrom using one or more processing units or encoders into encoded content suitable for transmission over the core network and/or the edge network; and sending the encoded content via the transmission network to the client.

According to another aspect, a system for a media distribution network is described, wherein the media distribution network comprises a core network with at least one core storage unit and at least one edge network interconnecting the one or more core storage units to one or more clients. The system is configured to: transform source media content into an interim format, thereby providing transformed content; store the transformed content on one or more core storage units; receive a request for the source media content from a client; encode the transformed content or intermediate coded content derived therefrom into encoded content suitable for transmission over the transmission network; and send the encoded content via the transmission network to the client.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows an example distribution network;

DETAILED DESCRIPTION

The shift towards a flexible, highly configurable network infrastructure driven by the adoption of software defined networking (SDN), the push of caching and compute capabilities further into the networks' edge, as well as the growth of the Internet of Things (IoT) open opportunities to exploit new methods for improving the efficiency and personalization of network/cloud distributed, stored and delivered multimedia. Traditionally, multimedia delivery over broadcast systems leverage a one-to-many model. Yet the growth of today's OTT (over the top)/network delivered multimedia services predominantly leverages a unicast (one source to a single receiver) model which, when coupled with a network comprising storage and computational resources, enables an opportunity to dynamically provision network resources, to respond to feedback (from the network, playback device and/or the playback environment itself), to process and cache content at the network's edge, etc. This combination provides an opportunity to drive a paradigm shift in how multimedia is stored, distributed and delivered to the end consumer in order to improve efficiency in terms of the quality-per-bit delivered to multimedia devices, to enable the underlying network to achieve capacity, network storage caches to be utilized more efficiently, to reduce the amount of overhead required to maintain the connection state between a server and a client, etc. In the present document an efficient multimedia capture, storage, distribution and delivery system for bi-directional IP-based network communication channels is described.

Figure 1:
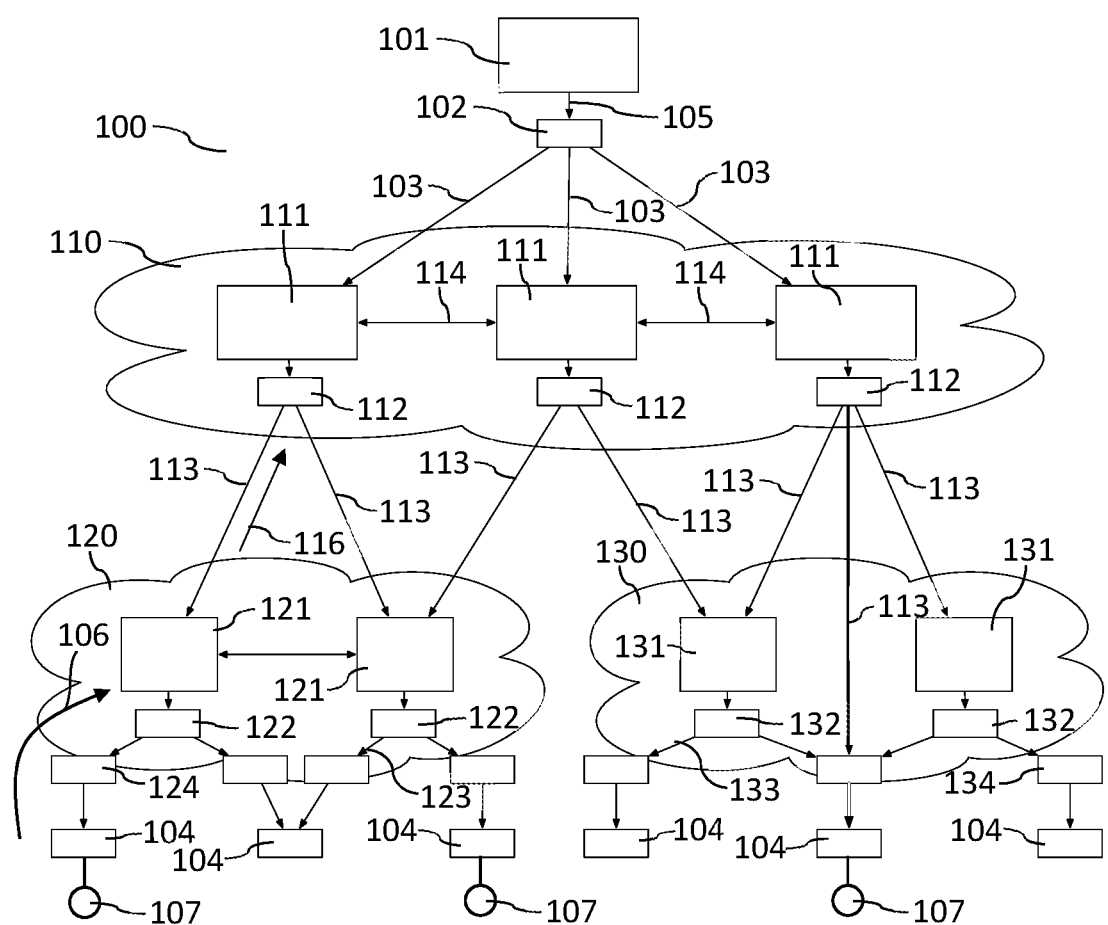

FIG. 1 shows an example distribution network 100 for distributing media content. The network 100 comprises a media source entity 101 (e.g. an origin server) which is configured to store and/or to provide original media content or source content 105. The original media content 105 may be provided to one or more clients 104 via one or more different (sub-) networks 110, 120, 130. For transmission purposes, the original media content 105 is typically encoded using one or more different encoders 102, 112, 122, 132. All the encoders 112, 122, 132 within the network 100 (possibly apart from the origin encoder 102) may be configured to encode content differently, based on the requested content, the network conditions, the type of a client 104 and/or the environmental conditions of a client 104. The original content 105, or a customized/personalized version of the original content may be decoded by the client 104 or a network embedded decoder 124, 134 located at the network's edge.

The uncompressed multimedia source content 105 may be transformed (e.g. partially encoded) into a single or more than one interim format. Each interim format is preferably suitable for efficient storage and/or delivery, dependent on the location within the network 100 and/or the demand for the content. The interim format may ensure consistency among network storage locations enabling provisioning of new network storage locations from one or more existing network storage locations and multi-source downloads without sacrificing personalization and quality. Furthermore, these one or more interim formats may support on-demand (dynamic) personalization and/or the generation of prioritized subsets with unique framing characteristics, presentations and/or subsets containing additional coding which is suitable for delivery to one or more playback devices 104 (e.g. mobile devices, TVs, computers, etc.). By way of example, for source media 105 or a subset of source media components comprised of audio, a plurality of time-to-frequency transformations may be applied to LPCM (Linear Pulse Code Modulation) sampled audio source(s) of various frame sizes and/or window functions. Filterbank types utilized in this step can include one or more of: MDCT (Modified Discrete Cosine Transformation), CQMF (Quadrature Mirror Filter) and/or variants thereof. The time/frequency transformations may be implemented in a manner such that the transformed media content 103 in the interim format is compatible with the filterbank requirements of standardized audio coding systems including: MPEG AAC, HE-AAC, MPEG-H, MPEG-D USAC, AC-3, E-AC-3, AC-4, Opus, etc. The resulting time-to-frequency coefficient data, or derivatives of it, may be processed and formatted into a representation suitable for efficient storage in local memory, network, cloud, distributed storage and/or serialization in a subsequent step. Hence, transformed content 103 in an interim format (also referred to herein as "super-mezzanine" format), which may comprise one or more frequency-domain representations of multimedia source content 105 may be generated.

In other words, the source content 105 may be partially encoded or transformed within a primary encoder 102 to provide transformed content 103 in an interim format. As an example, the transformed content 103 in the interim format may comprise one or more time-to-frequency representations of the source content 105 (e.g. comprising time-to-frequency coefficient data).

Transformed content 103 may be further encoded and/or personalized to form intermediate content 113, 123, 133 in one or more derivative interim formats optimized for storage within an edge network 120, 130 and/or for delivery to sets of client devices 104 with similar properties. As an example, the capability to display resolutions above 720p of the video of transformed content 103 may be removed and/or audio playback may be limited to no more than 2 channels by encoder 112, forming intermediate content 113 in a derivative interim format. The intermediate content 113 in the derivative interim format may be sent to a mobile edge network 120 that consists of mobile client devices 104 that only support lower resolution video and/or stereo playback. The intermediate content 113 in the derivative interim format can be stored locally at the storage entity 121 within the mobile edge network 120 to support future requests. Alternatively or in addition, the intermediate content 113 may be encoded further by a downstream encoder 122 to support specific network and client requirements. Each encoding process generating a new derivative interim format may customize the content for optimal delivery for a given network 110, 120, 130, network path and/or set of clients 104.

The full, a subset and/or other derivatives of the transformed content 103 may be further processed using network coding (e.g. RLNC, Random Linear Network Coding) and/or forward error correction (FEC) coding prior to being distributed to the core, edge and/or any or all points-of-presence (PoP) across an operator's network storage domain(s) and/or the clients 104 themselves to improve network storage provisioning performance, enable multi-source and/or multi-path downloads, improve resiliency to network interruptions, etc. In other words, the transformed content 103 may be encoded within the primary encoder 102 using network coding and/or FEC coding. Furthermore, the transformed content 103 may be stored in a network coded or FEC coded format, in its entirety or as a subset, on one or more storage entities 111 within a core network 110 and/or on one or more storage entities 121, 131 within one or more edge networks 120, 130, e.g. an Multichannel Video Programming Distributor (MVPD), broadband, cellular transmission network 120 and/or an Internet Service Provider (ISP) network 130; and/or may be delivered in a network coded or FEC coded format to a client 104.

Hence, in the context of a primary process, transformed content 103 or intermediate or derived content 113, 123, 133 may be located and/or stored on one or more storage entities 111, 121, 131. The transformed content 103 may be encoded in an interim format which is efficient for storage and for subsequent client and/or edge network dependent adaption.

An encoder 102, 112, 122, 132 may be activated "on-demand" by one or more clients 104 (wherein the one or more clients 104 have exhibit one or more different client types, e.g., TVs, mobile devices, laptops, etc.) that are connected to the network 100 and that request multimedia content and/or by another process within the network 100. Each encoder 102, 112, 122, 132 may continuously compute time and/or frequency masking curves, or otherwise compute a customize/personalized representation, of the original content 105 or of content 103, 113, 123, 133 in an interim format, based on a plurality of active and/or passive feedback sources, including (but not limited to): network sensors, playback environment sensors, device characteristics and/or user preferences. The final bit allocation process and bitrate may then be computed (notably optimized) prior to formatting the transformed content 103, 113, 123, 133 into one or more compressed interim or final formats for consumer delivery over a (bi-directional) delivery network 110, 120, 130. Each encode process may be dynamic and may adapt continuously to changes in network conditions, the SNR of the playback environment, etc. By way of example, moving an active playback device 104 from a high to a low SNR environment may yield a (real-time) decrease in the bit allocation/bitrate, since an acceptable quality to a listener or viewer in a low SNR environment may be satisfied with a lower bitrate/quality representation of the original content 105.

Hence, the transformed content 103 or a derivative may be further encoded and/or personalized one or more times using encoders 112, 122, 132 in dependence of feedback information 106, 116 provided by a network 110, 120, 130 and/or by a client 104 and/or by network operator estimates based on the type of edge network 120, 130 and/or based on a distribution of the type of connected clients 104, etc. By doing this, encoded content 113, 123, 133 for a client 104 may be provided. By adapting the coding of the content based on the feedback information 106, 116, an improved tradeoff between transmission bandwidth and rendering quality can be achieved on an edge-by-edge network basis or on a client-by-client basis.

Transformation and/or the processing steps may be instantiated at different processing and/or storage nodes 111, 112, 121, 122, 131, 132 within the distribution network 100. Alternatively or in addition, each transformation and/or processing step may be controlled at a local level (independently), via a distributed control system, and/or via a centralized control (orchestration) system. The control system may be configured to optimize multimedia network traffic at a global, sub-network or hyper-local scale. This may allow fine-grained control over multimedia traffic bitrate(s) and/or interim formats to improve the use of available network capacity, to optimize network storage capacity, to maximize throughput, to maintain a constant quality of experience/service for all endpoints 104 serviced from a node 111, 121, 131, to maintain fairness, to overcome network disruptions (e.g., packet loss, premature connection termination, etc.) and/or to minimize latency on a dynamic (frame-by-frame) basis through the use of network coding with or without feedback from the network 110, 120, 130, from a playback/rendering device 104, a clients' personal preferences, and/or from a playback environment.

Hence, feedback data 106, 116 may be provided to a storage node 111, 121, 131 or to a corresponding encoder 112, 122, 132 and the transformed content 103, 113, 123, 133 may be (further) encoded and/or personalized based on the feedback data 106, 116. In other words, one or more attributes in a subsequent process for providing encoded content 103, 113, 123, 133 may be dynamically driven based on feedback data 106, 116. The feedback data 106, 116 may comprise or may relate to:

active network conditions e.g. congestion, delay, packet loss, available bandwidth, hop count, etc.
network storage and/or encoder state information e.g. availability, load, reliability, etc.;
playback device's capability and/or context e.g. resolution capability, HDR compatibility, number of transducers, transducer frequency response, etc.;
codecs supported by an active playback device 104;
playback environment information collected from IoT device sensors, mobile phone sensors, tablet sensors, PC sensors, etc. e.g., signal-to-noise ratio (SNR), ambient sounds, ambient light, etc.;
client preferences e.g., language selection, dialog enhancement preferences, etc.;
client engagement e.g., measures of attention emotional impact, etc.; and/or
Geolocation of a playback device 104.

By using the above mentioned scheme for distributing content 105, storage and management complexity may be reduced, while enabling reduced processing complexity. The content 105 may be deployed while continuously adapting and/or optimizing a requested multimedia stream for efficiency and/or for maintaining a target experience/service level for different client nodes 104. Furthermore, improved storage and cache efficiency and opportunities may be achieved by enabling each content storage/cache location 111, 121, 131 to service every possible playback device 104. Furthermore, improved integration with next-generation IP-based transport mechanisms and/or protocols that enable multiple path or multiple source delivery may be achieved.

When a request for content 105 is received by a client 104, a central controller, and/or a processor node 112, 122, 132 with or without feedback information 106, 116 about the downstream network 120, 130 and/or a playback device 104 or subset of playback devices 104, one or more processes can be dynamically instantiated along the entire delivery path, thereby allowing for further optimization (using the feedback mechanism described above) of the bitrate at various points within the distribution network 100 including e.g. feature selection based on personalization selected by the consumer endpoint/client 104.

The schemes outlined in the present document enable a reduction of network 100 bandwidth and storage requirements by utilizing network resources, e.g., bandwidth and storage, more efficiently and by personalizing content at different stages within the network 100. e.g. instead of the origin server 101 or the CDN (Content Delivery Network) 111 (i.e., in lieu of an ABR, Audio/Video Renderer). Furthermore, the described schemes enable improved delivery of experiences to small, low power and computationally limited devices 104 by offloading a substantial portion of the computationally expensive processes to network elements 102, 112, 122, 132 when necessary. For example, decoding AC-4 at the edge of a network (e.g. within a decoder 124, 134) may be used to support low power and computationally constrained consumer devices 104, e.g. mobile and hearables. Furthermore, the described integration with the network may provide additional control of the content delivery pipeline allowing modifications such as inserting redundancy using network coding or FEC coding to be made on-the-fly to help recover from network disruptions or other obstacles that can impact the consumers experience. Examples include the delivery of content over wireless networks, which present unique challenges related to mobility, dynamic channel conditions, etc.

As indicated above, an uplink and/or return channel may be provided from an active playback device 104 and/or other devices e.g. sensors 107 contained within the playback environment and/or a network sensor to directly control of an audio/video encoder's current bitrate via continuous adjustment of a number of encoder-specific control parameters including: quantization/bit allocation, coded bandwidth, sampling rate, etc. based on a combined set of playback device capabilities, environmental characteristics captured from one or more active sensors contained within the playback environment, and/or network conditions.

Hence, a fine-grained encoder bitrate control via active sensing of a playback environment and/or network conditions may be provided. Sensing may include passive and/or active feature extraction of playback environmental characteristics including: playback loudness/level, noise spectrum (for computing current/semi-current SNR), active context (headphone/speaker, music/other, etc.), device-to-listener/viewer orientation, active transducer frequency response, geolocation, biofeedback, and/or emotional engagement. Sensing may also include passive and/or active feature extraction of network conditions and/or characteristics including: detection of congestion, packet loss, buffer bloat, server load, network configuration changes, link quality, link capacity, etc. The sensed information regarding the playback environment and/or network conditions may be provided as feedback data 106, 116. This feedback data 106, 116 may be used for adapting multimedia pre-processing, coding, and/or personalization for downstream storage 121, 131, processing 122, 124, 132, 134, and/or clients 104. In one example for playback environments where the SNR and/or the active transducer frequency response exceeds some value (e.g. in a quiet home theatre environment or closed-ear headphones/earbuds), the use of endpoint sensor control of the encoder bitrate may be interrupted, and a mode may be used that solely monitors network conditions (connection capacity, latency, etc.) as feedback data 116.

The environmental sensors 107 used in the feedback path may include (but not limited to) the following: one or more of a combination of sensors such as light sensors and/or microphones found in IoT and/or CE (Consumer Electronics) devices such as mobile phones, tablets, headphones, earbuds, laptop PCs, smart speakers, soundbars, AVRs, etc.

The network sensors used in the feedback path may include (but not limited to) the following: network monitoring processes executing on a network device, a function of a software defined network (SDN), and/or dedicated network sensors attached to the delivery network 100. A network device executing a monitoring process may consist of (but not limited to) a router, switch, cache, load balancer, etc. Furthermore, the monitoring process and/or network sensor may be implemented within a SDN as an independent virtualized network function (VNF) and/or as part of another.

Furthermore, feedback from multiple playback devices 104, environmental sensors 107, and/or network sensors may be aggregated together to form feedback 106, 116. Feedback aggregation may comprise aggregating feedback from multiple network and/or environmental sensors.

As indicated above, the initial processing step may be used to prepare transformed content 103 intended to be delivered over a network 100 by using an interim format which exhibits the flexibility to enable subsequent steps for generating a compressed bitstream in one or more standardized or proprietary formats. Moreover, this interim format may also be suitable for customization based on the end user (client 104) constraints and/or preferences. This interim format again may enable various bitrates/qualities, personalization, etc. to be derived as needed and on-the-fly.

Transformed content 103 or its derivatives 113 in the interim format may be distributed throughout the network and stored within content distribution networks (CDNs), edge caches, etc. for processing and/or for final preparation for delivery and playback on demand. As outlined above, the content 113 and/or its format may be dependent on the network 120, 130 and/or the client 104 that the content 113 is provided to and/or is prepared for.

The following describes the network provisioning and storage step. As stated earlier, requests for content may be received at a storage entity 111. In reaction to this, the transformed content 103, 113 in interim format may be processed, on-the-fly, into a format suitable for downstream storage and/or delivery, and later consumption, to an end device 104. This processing may take place wherever the transformed content 103, 113 in the interim format is stored within the network 100, 120, 130, or may take place along the route from the storage location of the transformed content 103 to the end device 104. Furthermore, the processing may include various adaptations to support personalization, based on network performance and/or user preferences, that determine what portions of the content is stored and/or delivered. As a result of this, content may be stored, managed and/or delivered in an efficient manner, while providing a platform for personalizing of the content 105 to a client 104 (e.g. to a particular type of client 104).

Figure 2:
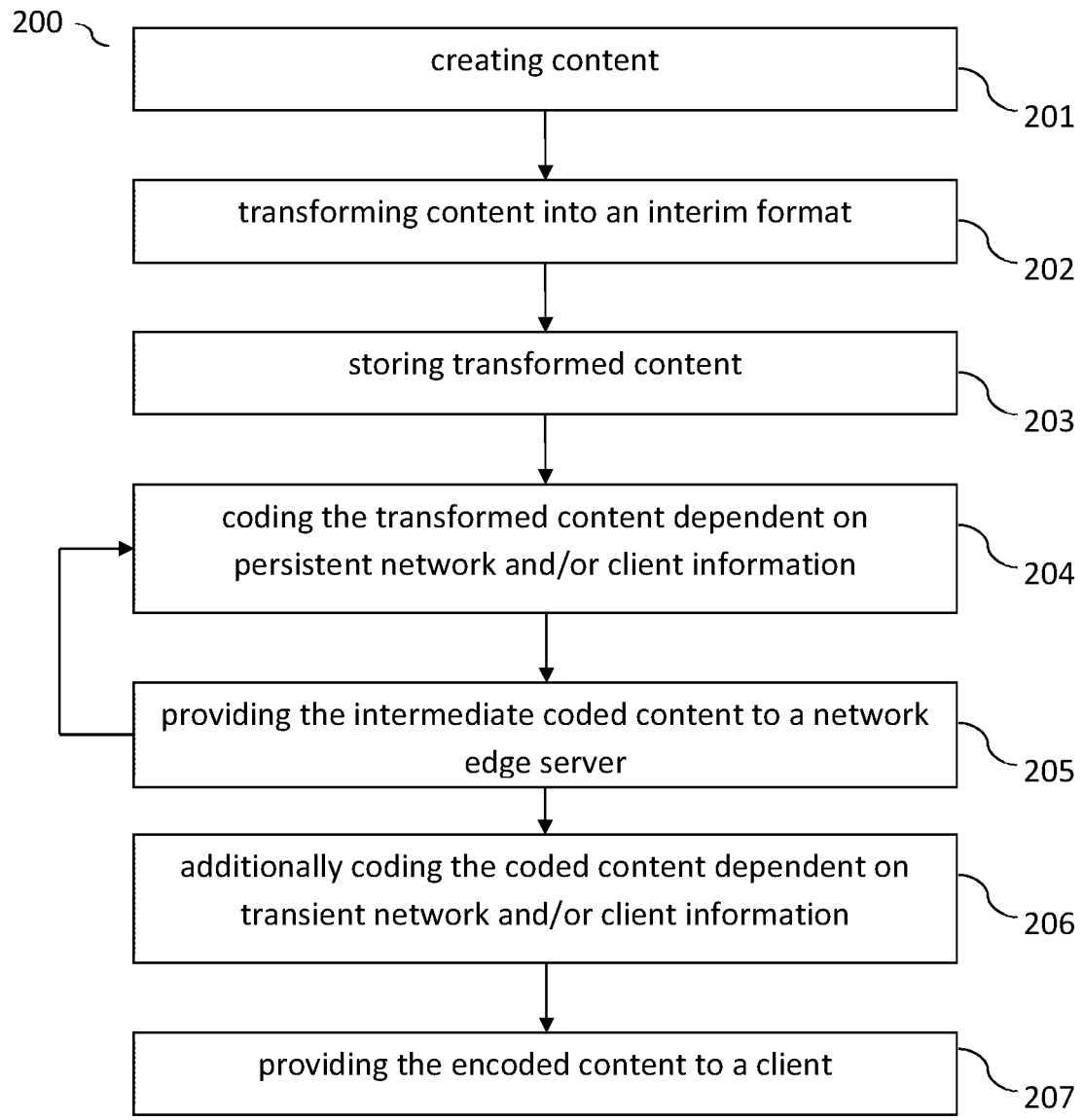
FIG. 2 shows a flow chart of an example method for providing source content to a client.

FIG. 2 shows an example workflow or method 200 for providing source content 105 to a client 104. Furthermore, FIG. 1 shows an example distribution network 100. The initial encoding process shown in FIG. 2 prepares source content 105 for wide-spread distribution and storage within the core network 110. For this purpose, the initially created source content 105 (step 201) may be transformed into the interim format, thereby providing the transformed content 103 (step 202). This interim formatted content 103 may be distributed throughout the network 100 and may be stored on one or more storage entities 111 for later consumption (step 203). Furthermore, this interim formatted content 103 may be encoded using network coding (e.g., RLNC) preferably implemented in a deterministic manner, or FEC coding to enable efficient provisioning of network storage and client delivery. Upon a request from a central controller, a downstream cache 121, 131, and/or an end-user device 104, the interim formatted content 103 may be encoded again into a derivative format to optimize storage and delivery through downstream storage and edge networks 120, 130 (step 204). This pre-encoded content may be referred to as intermediate coded content 113. In an example, the secondary encoding process may make a limited number of personalization's based on an aggregated collection of feedback and/or estimates of downstream network/link conditions, network congestion, device profiles, or other client personalization parameters to reduce the required bitrate into a format that optimizes storage and delivery downstream of the processing node 112. As an example, the secondary encoding process may downmix content to a stereo representation in case a request made through a mobile/3GPP network 120 is received. This downmixed version can be stored on a storage unit 121 within the mobile/3GPP network 120 and may be delivered to other mobile devices 104 without requiring another mobile device 104 to request content from the original, core network storage entity 111 (step 205). As content 103, 113 traverses the network 100 towards the end playback device 104, one or more additional encoding processes may take place to further customize the bit stream (as highlighted by the feedback loop from step 205 to step 204 in FIG. 2), and the encoded content 123, 133 may be optionally stored in an interim representation or a network coded representation to support delivery to other playback devices 104 requiring the same or similar customizations. Each of these customizations may be made to optimize storage and/or delivery of the content, to increase efficiency and/or to take into account information that may not have been available or could not be acted upon deeper within the network 100. Eventually, the encoded content 123, 133 may be provided to a client 104 (step 207).

The encoding processes described above do not necessarily have to only alter or modify the essence of the streamed content. Rather, the encoding processes may also alter/encode the bit stream to optimize storage and delivery of the content over a network based on the transport mechanism used, the network topology, or the observed network conditions. This encoding process can be applied at any point within the network 100 wherever an encoder 102, 112, 122, 132 exists and can be tailored in real-time to optimize storage and transport efficiency. In an example, the client devices 104 may perform a similar function as a processing node or encoder 122, 132 and/or storage unit 121, 131 to support content delivery to their peers.

One approach is to encode content bit streams using network coding. This can be done in a number of different ways depending on the situation. A first example involves network coding the interim formatted content 103, or a derivative, during an encoding process and distributing this network coded content to core network storage 111 can improve content availability, reduce content management complexity, and increase subsequent delivery performance when a request is received. One such example includes an end device 104 making multiple requests to different network storage locations 111, 121, 131 (i.e., multi-source) for the same network coded content. Each network storage location 111, 121, 131 can service the received request without having to coordinate/communicate between themselves. This example also applies to the case where an end device 104 makes multiple requests over different network paths to the same network storage location 111, 121, 131. The encoder 102, 112, 122, 132 may use network coding to send coded information on each path enabling efficient, multi-path transportation of the content.

A second example involves using network coding to code together disjoint elements of the interim formatted content, or its derivative. One possible realization of this includes using network coding to code together substreams, parameter streams, presentations, or elements of an object-based audio codec.

A third example involves using network coding to code the interim formatted content, or its derivatives, prior to storing it within the network 100. Various storage locations 111, 121, 131 can then form a point-to-point network to optimally distribute an entire representation of the content or a subset of the content providing increased error redundancy/failure resiliency.

A fourth example involves using feedback from downstream network appliances to inform an encoder 102, 112, 122, 132 of potential congestion or packet loss. The encoding process can then use network coding to add any required redundancy into the bit stream to ensure a given quality of service. Redundancy can be applied to any content, storage location, or encoding process regardless of the location within the network 100 or the format of the content (e.g., the content can have already been encoded and personalized).

A further example is to encode content (e.g., originally contained within an interim format) in real-time within any network located encoder 102, 112, 122, 132 into a form optimized for delivery based on feedback 106, 116 obtained from network-based appliances and/or sensors that may report statistics and conditions related to congestion, packet loss, network policies, etc. Examples include downmixing, conversion to a lossy audio codec, or otherwise reducing the bitrate of audio and/or video content so that a given quality of service is maintained over a network link that may be experiencing network congestion, packet loss, and/or other degradation (as reported by a network-based sensor).

The combined approach of using an interim format, and its derivatives, along with network coding can support both unicast (one-to-one) and multicast (one-to-many) streams. The description presented above has assumed a unicast workflow. However, the system architecture also supports multicast workflows. A multicast workflow is dependent on the underlying network capabilities. Multicast session management may be automatically performed by the network or a pseudo-multicast session may be managed by the networked encoders 102, 112, 122, 132 themselves using standard unicast methods (e.g., TCP or UDP). For this purpose, the networked encoders 102, 112, 122, 132 may be provided with information regarding end devices 104. As an end device 104 joins a multicast session, it connects to the nearest networked encoder 102, 112, 122, 132 and provides its device profile, user preferences, etc. The networked encoder 102, 112, 122, 132 collects all such information from any end device 104 that connects to it. It then calculates a single format that will support every connected end device 104 (i.e., an end device 104 will be able to decode this format and extract the appropriate content). The network encoder 102, 112, 122, 132 may send this information to it upstream encoder 102, 112, 122, 132, which may perform the same computation. This may continue until the source encoder 102 is reached or the entire set of client devices 104 is contained under and/or handled by a single network encoder 102, 112, 122, 132. Once this information propagates to the content source (i.e., content root), a format is encoded that meets the requirements of each networked encoder/end device below it (i.e., the network encoders' children). This encoded content is then transmitted from the content root to downstream encoders 112, 122, 132 and/or client devices 104 using standard multicast methods. Upon reception of the encoded content, each downstream encoder 112, 122, 132 may further encode and/or personalize the content into a new encoded version that meets the requirements of each of its children. Network coding may also be used to add redundancy into the multicast bit stream to ensure reliable communication of the encoded content between each networked encoder 102, 112, 122, 132 and end device 104. The network codec used for this purpose may be continually updated as network conditions between network encoders 102, 112, 122, 132 and end devices 104 change.

Encoders 102, 112, 122, 132 imbedded into a network 100 can be implemented in a variety of methods. Approaches involve using cloud-based processing resources. These resources can take the form of services that may be attached to the network core, network edge computing resources, or even the end clients/devices 104 themselves. Another approach to implementing the encoders 102, 112, 122, 132 is to create a virtualized network function (VNF) within a software defined network (SDN). This VNF encoder can be located within any SDN network node alongside other VNFs that perform services like routing, switching, network defense (e.g., firewall), network data collection, etc.

The storage 111, 121, 131 and encoder 102, 112, 122, 132 nodes can be managed and operated in a distributed or centralized mode, or a combination of the two. In the distributed mode, each encoder generates and distributes messages, in the form of network packets, to its one or more neighbors (generally considered the encoder immediately before and after it within the encoding chain). These messages may include information about end device profiles, long-term network statistics, utilization, optimization information, etc. In the centralized mode, a networked storage and encoder controller may send each networked encoder and storage device information and commands regarding operation and global network conditions. Whether a distributed and/or centralized control mode is used, a variety of policies can be used to manage both the storage and/or encoder network nodes. Examples of policies include, but are not limited to, a best effort policy where content delivery is managed on a client-by-client basis and no coordination is performed across clients, or a minimum guaranteed quality policy where a service guarantees a minimum quality which is delivered to a subset of clients that are capable of receiving such quality under ideal network conditions. The latter case involves optimization of the delivered quality across multiple clients 104 while taking into account constraints such as network/link capacity, switch/router throughput, delay, etc. that jointly affect the entire subset of clients.

Distributed encoding and/or processing along the delivery path utilizing feedback may be performed. Integration of multimedia processing into the lower level network functions themselves can potentially provide more efficient and adaptive delivery of content over a wide range of existing and future consumer devices 104 ranging from 4K TVs and Atmos-enabled AVRs (Audio/Video Renderers) including mobile devices and hearables. The approach which is described in the present document may drive a paradigm shift in how encoding and decoding is performed and then stored within a CDN and/or other network attached storage devices for delivery. In one proposed model, multimedia content may be partially encoded into a single interim format suitable for enabling the final bit allocation, bitrate, experience, personalization and/or stream formatting on-demand when requested from the playback client 104. Optimization of each of the non-exhaustive list of attributes above is envisioned to be dynamically driven from several available feedback sources including: nodes/links throughout the network path in use, playback device/context, codec and/or playback environment. Benefits include a reduction in storage complexity while enabling lower complexity processing to be deployed in the network 100 to configure and continuously adapt the requested multimedia stream optimized for efficiency or for maintaining target experience/service level across client nodes 104.

Analytic, feedback and/or sensor-driven personalization may be performed. Real-time collection of network performance statistics via embedded network sensors, feedback from a playback device 104, sensing of environmental conditions via the playback device 104 and/or other deployed IoT devices, etc. can be used to inform cloud-based encoding, transcoding, and decoding processes. This out-of-band information can help optimize bitrates on both a local (single flow) and global (multiple flows) scale. Furthermore, this information may be useful for personalizing experiences.

Examples of factors that can inform the personalization of content include, but are not limited to, the following:

1. Measures of performance of a single network link such as a Wi-Fi or LTE link connecting the device 104 to the Internet. Information concerning the SNR over a wireless link, notifications of congestion, packet loss rates, delay, etc. which can be used to preemptively adjust the playback experience by lowering the playback bitrate, adding redundancy using network or FEC coding, etc. before a disruption or unintended degradation of quality impacts playback.
2. Measures of performance within a network comprised of multiple client devices 104, routers, switches, storage devices, computation devices, etc. Information concerning congestion along the network delivery path, demand from other client devices 104, load on and reliability of storage and/or computation devices, end-to-end connection reliability, and/or end-to-end and/or link-by-link packet loss, delay, available capacity, which can be used to adjust the playback experience to effectively use all available network resources in order to maximize playback performance
3. Measures of viewer engagement such as head and/or eye tracking, heart rate, location within the playback environment, etc., which can help inform the encoding process by delivering a quality that is representative of the level of engagement. If a person is watching a movie but is not looking or paying attention to the screen of a client device 104, there is typically no reason to transmit video data. Similarly, if a person is viewing content with 5.1 channels of audio but is viewing it from outside of the 5.1 speaker system's footprint, it may be perceptually better to playback the content in stereo rather than in 5.1.
4. Information collected by IoT or other CE devices (with microphones and/or other sensors) such as ambient noise and light levels along with other environmental conditions that impact QoS/QoE (Quality of Service/Quality of Experience), can be used to adapt streaming media attributes such as bitrate, coding mode, resolution, etc. dynamically based on direct feedback from the playback environment. For example, lower quality audio may be perceptually transparent and a lower bitrate can be used for playback in a noisy environment while it may not be sufficient in a quiet environment.
5. Client preferences and related information such as hearing or eye sight sensitivity can be used to adapt the streaming media attributes in such a way that a lower bitrate representation can be used while being perceptually transparent.
6. Information concerning the playback device and/or system such as hardware models, speaker configurations, screen resolution, network connectivity, etc. can be used to encode content in such a manner as to take advantage of the playback device and/or system's full capabilities while eliminating the requirement to transmit information that the device and/or system cannot use. An example includes the playback of audio on a speaker system that cannot accurately replicate certain frequencies. In this case, the transmission of audio in those frequencies is not useful and can be eliminated during an encode step to reduce the bitrate.
7. Aggregates of the above information when more than one client device 104 is active. Examples include personalizing the encoding of content intended for more than one client device 104 based on statistical measures, overall demand, etc. by including the union of all personalization features required by the entire set of clients 104.

Hence, a coding format may be provided which allows for lightweight transcode to lower bitrates somewhere along the delivery chain in a content delivery network 100. In particular, network-distributed video and/or audio coding may be performed such that video and/or audio encoding and decoding is distributed across three or more processing units 102, 112, 122, 124, 104 within a network 100. The processing units 102, 112, 122, 124, 104 are interconnected through links with individual bandwidth constraints, and each processing unit 102, 112, 122, 124, 104 has an individual processing capability. One of the processing units is typically the "original" encoder 102 and one of the processing units is typically the "final" decoder 124, 104, as illustrated in FIG. 1. A processing unit 102, 112, 122, 124, 104 may be a node within the delivery network 100 which executes functionality for video and/or audio transactions in a distributed manner.

In order to facilitate the transcoding within a processing unit 112, 122, 132 (also referred to herein as encoder or transcoder), the transformed content 103 may exhibit a bitrate overhead compared to the original content 105. The bitrate overhead may be used to increase the efficiency of the transcoding operation. Hence, by increasing the bitrate overhead, the transcoding latency and/or complexity may be reduced. In particular, increasing bitrate prior to transcoding, to the extent of complete simulcast, may limit transcoding latency and/or complexity to down to zero. On the other hand, if increased latency and complexity is allowed, transcoding may be performed with reduced or with no additional bitrate.

In particular, the transformed content 103 may comprise side-information and/or transcode metadata, which facilitates the transcoding performed by one or more intermediate processing units (notably encoders or transcoders) 112, 122, 132. In other words, the interim format may comprise side-information and/or transcode metadata for facilitating the transcoding or encoding process that is performed by the one or more encoders 112, 122, 132 of the media distribution network 100.

In the following, the provision of side-information and transcoding is described in more detail in the context of audio coding, notably in the context of channel coding and object coding of audio. Transcoding side-information may be provided in a backwards compatible container of a bitstream, e.g. of an AC-4 bitstream. The side information or transcode metadata may comprise
- A-SPX information (i.e. information for spectral band replication or high frequency reconstruction) for different bit-rates;
- A-CPL settings (i.e. information for parametric stereo) for different bit-rates;
- ASF transcode helper information (e.g. for guiding the bit-rate allocation process for transcoding); and/or
- Specific control data which is not otherwise deductible from the bitstream, to reduce the complexity of the transcoding process.

Hence, in order to enable a network distributed audio coding with relatively low latency and relatively low complexity within the media distribution network 100, additional metadata or side-information may be sent along with the bitstream from the origin server 102, wherein the additional metadata may be used during transcoding, e.g. near the edge of the network 100. This metadata may represent or may be audio coding data that would introduce significant complexity and latency if calculated during transcode, but which, on the other hand, may exhibit reasonably low bit-rate. Hence, overhead bitrate from the origin server 102 may be traded against latency and complexity during transcode.

Additional metadata may be side information to guide a high frequency reconstruction algorithm (which may be used in an audio codec at relatively low bit rates), parametric stereo or multichannel metadata, and/or metadata describing suitable noise allocation strategies for waveform coding in an MDCT domain at a lower target rate than the rate of the interim format.

In an extreme version of an interim format, all desired rates and channel configurations may be simul-cast within the transformed content 103. This reduces transcode latency and complexity to the task of selecting a substream from the transformed content 103 provided by the encoder 102. However, in this case overhead of the interim format would be relatively high. The simulcast of suitable parameters to be used during and after transcode allows to trade the overhead of bit-rate in the interim format against latency and complexity in the transcode.

In an example, a stereo transcode may be enabled using suitable metadata as part of the transformed content 103 in the interim format. The transformed content 103 may exhibit the highest audio quality that may be requested by a client 104, such that transcoding may be limited to providing a reduced audio quality along with a reduced bit-rate. Transcoding may be performed within the MDCT domain, such that the window sequence of the transcoded content or the encoded content 113, 123, 133 may be the same as that of the transformed content 103. By doing this, latency and complexity of the transcode operation may be reduced. The interim format may be defined using an existing audio codec, e.g. AC-4. By doing this, a backwards compatible container may be used for carrying additional transcode metadata.

In order to be able a transcode to lower rates and to use high frequency reconstruction algorithms, suitable high frequency reconstruction (HFR) parametric data may be provided within or along with the transformed content 103. The HFR parametric data preferably covers the widest frequency range that is needed during transcode. In an example, the lowest possible bitrate may imply that high frequency reconstruction starts at 5 kHz and covers a frequency range up to 15 kHz. Another bitrate may imply high frequency reconstruction used from e.g. 13 kHz to 20 kHz. This would imply that the HFR parametric data available in the interim format should cover the frequency range from 5 kHz to 20 kHz. This may be accomplished by simulcasting the entire set of HFR parametric data for every possible target bitrate. Alternatively, a super set of HFR parametric data may be provided, which enables the transcoder or encoder 112, 122, 132 to derive the relevant HFR parametric data for a particular target bit-rate. The HFR parametric data may notably comprise information regarding the spectral envelope of the high band to be reconstructed by the high frequency reconstruction algorithm. The spectral envelope may be transmitted, e.g. as part of the transcode metadata, in the interim format, with a suitable time and frequency tiling to enable transcode to various different target bit-rates.

For the waveform codec part in the MDCT domain, the transcode metadata may comprise encoding specific control data not otherwise deductible from the bitstream.

In case of stereo audio coding, the following stereo coding modes may be considered:
1. Pure waveform coded stereo (i.e. using enhanced Mid/Side, Mid/Side, or L/R coding);
2. A hybrid scenario where parts of the frequency range of an audio signal is covered by waveform coded stereo, and parts of the frequency range is covered by parametric stereo coding tools.
3. Pure parametric stereo coding (A-CPL, i.e. Advanced Coupling), where the entire frequency range is coded with parametric stereo coding tools.

In an example, where transcoding is to performed in the MDCT domain for relatively low target bit-rates, restrictions may be imposed due to the stereo coding techniques. The above mentioned hybrid scenario typically restricts stereo coding to Mid/side or enhanced Mid/Side, in order to provide the mid signal as mono downmix for parametric stereo coding. In such cases, the same window sequence is typically used for both channels.

In an example, high frequency reconstruction (e.g. A-SPX as part of AC-4) is performed prior to stereo reconstruction (e.g. A-CPL in AC-4). In such cases, the HFR parametric data comprised within the interim format may cover both stereo and mono. The HFR parametric data may be simulcast for both channel configurations, or a suitable superset may be provided which allows the relevant HRF parametric data to be derived for the stereo and the mono case.

Adaptive audio coding may be used in the context of the schemes outlined in the present document. Adaptive audio coding aims at achieving the best utilization of the available throughput by adjusting the operating bit rate of the encoder 112, 122, 132 as closely as possible to the throughput constraint (in addition to ensuring that the content playout is stable). The content may be encoded into several quality versions, and the client application may involve a control policy aiming at maximizing the playout performance by selecting an appropriate version of the content. An example of such a streaming scenario may be achieved with chunked coding of HTTP 1.1, where each chunk can (for example) comprise the content encoded at a specific bit-rate. The control policy of the client 102 may make decisions regarding the quality level for an upcoming chunk on a chunk-by-chunk basis. The provision of a limited number of versions of content may under-utilize the available bandwidth.

The transcoder/encoder 112, 122, 132 described in the present document may perform transcoding which aims at utilizing the entire available throughput for a client 104. The available throughput may be difficult to measure and it may fluctuate over time. The transcoder/encoder 112, 122, 132 may have access to signalling from the network transfer protocol. By way of example, the acknowledgement signals (ACK) of the network transfer protocol may be used to estimate the available throughput.

The estimation problem regarding the available throughput can be alleviated by utilizing explicit feedback data 106 from a client 104, for example, feedback data 106 indicating the fullness of the playout buffer of a client 104. Typically, the fact that the playout buffer is filling up indicates that the streaming bit-rate may be increased, while a decreasing buffer level may indicate that the selected bit-rate is too high.

Due to non-stationarity and variable complexity of audio signals, the bit-rate needed to achieve a certain quality is typically time variable. For providing an efficient rate adjustment policy at the transcoder/encoder 112, 122, 132, additional information may be used by the transcoder/encoder 112, 122, 132. For example, the complexity of the content 105 may vary on a per-frame basis (or on a per-segment basis), and the complexity can be estimated a priori and may be supplied as metadata together with the interim format (e.g., the complexity of a frame/segment may be represented, for example, by a value of a perceptual entropy for a specific frame). This side information or metadata may be used by the transcoder/encoder 112, 122, 132 for a control policy regarding the bit-rate of the encoded content 113, 123, 133. The control policy may make use of a utility function which indicates the achieved quality of audio content as a function of the allocated bit-rate. The utility function may be a function of the encoding difficulty of a specific frame or segment.

The control policy of a transcoder/encoder 112, 122, 132 may make use of feedback data 106 from a client 104 regarding the buffer fullness, which would allow estimating the buffer drift. The control policy may be designed to minimize the buffer drift, to maximize the utility function and/or to minimize the probability of content rebuffering (possibly simultaneously) on a per frame basis, or on a per segment basis.

Such an adaptive transcoding scheme may be implemented for example by means of the push technology of HTTP/2 and may make use of a dedicated transcoding service operating on a server.

The transcoder/encoder 112, 122, 132 may make use of the feedback data 106 from a client 104 to adjust the time density of I-frames. For example, if streaming occurs over an unreliable transmission channel, it may be beneficial to increase the frequency of I-frames even though coding efficiency is reduced.

The transcoder/encoder 112, 122, 132 may be configured to perform adaptation of the bit-rate by changing the coding technology or coding scheme that is being used. For example, MDCT-based coding of the full frequency spectrum may be used at relatively high bit-rates, while at lower bit-rates the MDCT-based coding may only be performed up to a certain cut-off frequency. The remaining part of the spectrum may be reconstructed using a bandwidth reconstruction algorithm (e.g., HFR). In general, the transcoder/encoder 112, 122, 132 may be provided with transcode metadata that guides the transcoding process. The metadata may be content adaptive or adaptive with respect to the playout device 104 that is used.

Figure 4A:
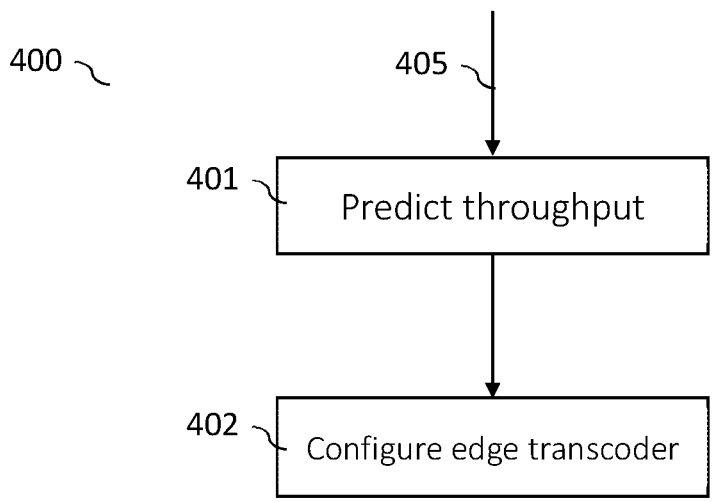
FIGS. 4A and 4B show flow charts of example methods for encoding media content in dependence of the available network throughput and/or bandwidth.
Figure 4B:
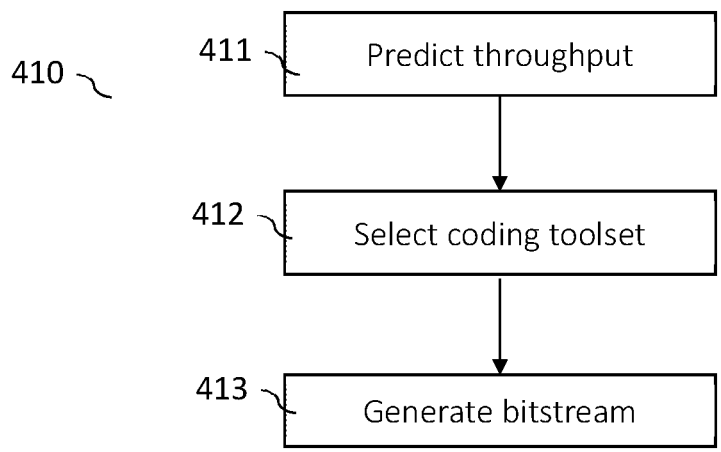

FIGS. 4A and 4B illustrate example methods 400, 410 performed by a transcoder/encoder 112, 122, 132. Based on the client feedback 106 and/or based on information derived from a network transfer protocol, i.e. based on information 405, the available throughput may be predicted (step 401). The operation of the transcoder 112, 122, 132 may then be adapted based on the available throughput (step 402). Alternatively or in addition, the throughput may be predicted (step 411), and an appropriate toolset for coding may be selected, based on the predicted throughput (step 412), and a bitstream (notably the encoded content 113, 123, 133) may be generated (step 413).

Figure 5:
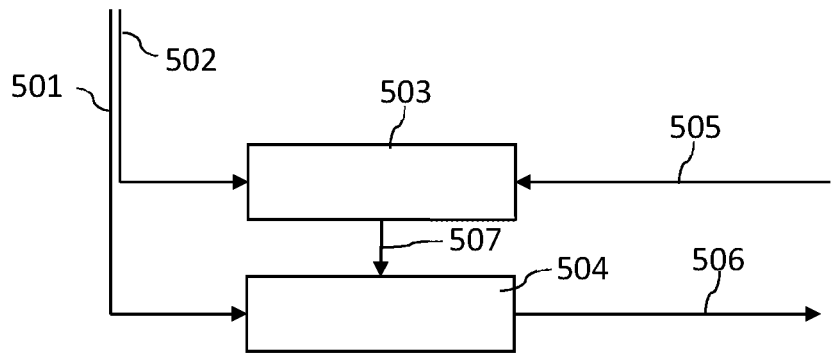
FIG. 5 shows example processing performed by an encoder/transcoder.

FIG. 5 illustrates the processing performed by a transcoder/encoder 112, 122, 132. The transformed content 103 in the interim format may be received. The transformed content 103 may comprise metadata 502 which is indicative of the difficulty or complexity of the media content 105. Furthermore, the transformed content 103 may comprises partially coded media data 501 such as MDCT waveforms, HFR parametric data, etc. A control policy 503 of the transcoder/encoder 112, 122, 132 may select an appropriate bit-rate 507 based on the metadata 502 and based on feedback data 106, 505 (notably regarding the buffer fullness of the client 104). Furthermore, a transcoding unit 504 may provide the interim coded or the encoded content 506, 113, 123, 133 based on the data 501 and based on the selected bit-rate 507.

The audio content may be encoded using object audio coding. Object audio coding allows a flexible adaption of the bit-rate by combining several audio objects and/or by simplifying an audio scene. In the case of object-based coding, the audio signal is represented by a set of audio objects associated with metadata (e.g., positional metadata). Typically, an increasing number of objects in the representation of an audio scene increases the reconstruction quality of the audio scene. The object-based representation may be adapted and/or transformed in accordance to the speaker configuration which is used for playout.

In the case of content delivery, an audio representation with a relatively high number of objects (N objects) can be stored centrally (e.g. in one or more storage units 111) and distributed to the transcoding nodes 112, 122, 132, where the object representation can be converted to an object representation with a reduced number M of objects (e.g. M<N). The representation with the reduced number of objects may be encoded and made available to the one or more devices 104 connected to the transcoding node 112, 122, 132.

The rendering operation may be performed close to the edge of the network 100 rather than on the client 104 (e.g. within a decoder 124). In such a case, the object-based content may be delivered as a channel-based representation (for example corresponding to the playout capabilities of the client device 104). Such a scheme may be beneficial if the client device 104 has limited computational performance (e.g., a battery powered mobile phone with a stereo playout may receive a stereo rendition of the content instead of an object representation consisting of a relatively high number of waveforms).

The content 103 may be distributed using a single high-quality interim format to many transcoding nodes 112, 122, 132 located e.g. at the edge of the network 100. The nodes 112, 122, 132 may then process the content for specific type of devices 104 that are using the node 112, 122, 132 (e.g., an LTE node would likely be serving mobile devices 104 with limited computational complexity and limited playout capabilities, while a node located close to an IXP (Internet Exchange Point) is typically serving various different types of devices 104).

Another aspect of the distributed processing of object-based content is related to dialogue enhancement. A dialogue may be associated with a set of dedicated objects. In some cases, the throughput constraint may restrict the number of objects that can be transmitted to a client 104. If such restriction occurs, it may be required to down-mix the dialogue and non-dialogue objects, thereby deteriorating a feature such as dialogue enhancement. The feedback data 106 may indicate that such a dialogue related feature is used. In such a situation, the dialogue enhancement may be achieved by boosting the dialogue object prior to the down-mixing operation. Such a scheme may be particularly beneficial in the case of file-based streaming, where the processing latency is less critical.

Figure 6:
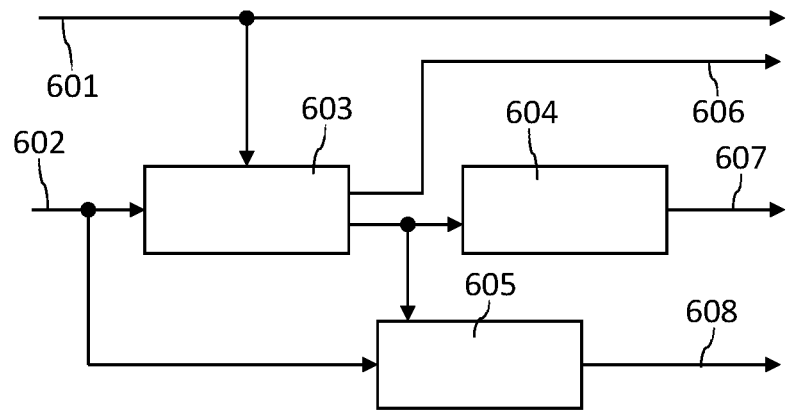
FIG. 6 shows example processing for downmixing audio objects.
Figure 7A:
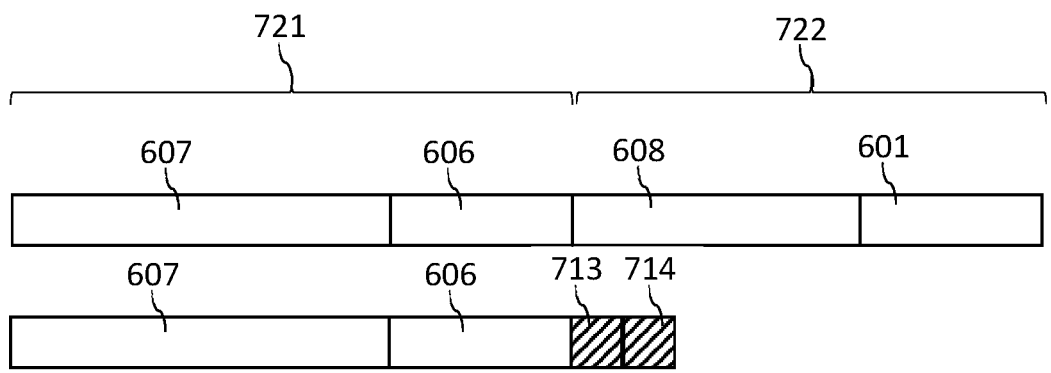
FIGS. 7A and 7B show example frames of transformed content and encoded content.
Figure 7B:
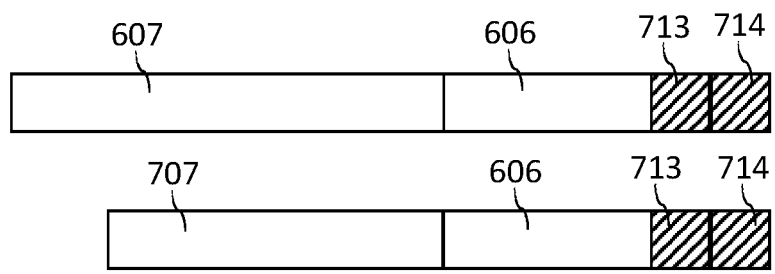

Adaptive streaming may be achieved by means of emulating layered coding (as illustrated in FIGS. 6, 7A and 7B). A lightweight transcoding to reduced quality and reduced operating bitrate may be achieved by editing a bitstream on the fly. In an example bitstream, N objects are coded parametrically using an M object downmix (N>M). The coding scheme may be such that the signal reconstruction may be performed to the N objects (yielding the highest quality), and to the M objects (yielding a reduced quality). In such a case, the bit stream syntax may comprise four parts: a waveform description of the M downmix objects; a metadata description of the M downmix objects; parametric up-mix information (e.g., coefficients of the up-mix matrix along with coefficients facilitating operation of decorrelators); and a metadata description of the N up-mix objects (e.g., positional metadata).

FIG. 6 illustrates an encoder 102 which may be configured to provide the above mentioned transformed content 103. The original content 105 may comprise object metadata 601 for the N objects, as well as waveform data 602 for the N objects. The N objects may be downmixed in a downmix unit 603 to provide the waveform data for the M objects, which may be encoded using the coder 604 to provide the waveform description 607 of the M objects. Furthermore, object metadata 606 for the M objects is provided. In addition, parametric up-mix parameters 608 may be provided using the parameter estimation unit 605.

FIG. 7A illustrates a frame of a bitstream comprising the downmix object waveforms 607, the downmix object metadata 606, the up-mix parameters 608 and the up-mix object metadata 601. The latter two are only required for full reconstruction 722 of the N objects, wherein the first two allow for a reconstruction of the M objects.

The transcoding node 112, 122, 132 may reduce the bit-rate by replacing the parametric up-mix information 608 with a dummy up-mix 713 (for example, the (dynamic) up-mix (prediction) matrix is changed from a N×N arbitrary matrix to a static M×M identity matrix that can be transmitted with reduced cost; the decorrelation coefficients may be dropped) and the positional metadata 601 may be replaced with a dummy payload 714 (for example it may be copied from the downmix)) It should be noted that due to the nature of the object-based representation of audio scenes, the parametric up-mix 608 may require a relatively high bit-rate, since the prediction matrices used to perform the up-mix typically allow for full flexibility of reconstruction (because the matrices are not sparse).

Furthermore, the coding scheme may be configured such that the up-mix parameters 608 may be computed based on uncoded down-mix waveforms. This results in an open-loop coding scheme, which may facilitate transcoding operation on the waveform coded downmix, thereby allowing for further reduction of the operating bit rate.

The object content may be transmitted to the transcoding node 112, 122, 132 using a single set of up-mix parameters 608, a single set of downmix object metadata 606, and a single set of up-mix object metadata 601, but several versions of the downmix waveform data 607 for different bit-rates. The transcoding node 112, 122, 132 may adapt the operating bit-rate to the available throughput by assembling the final bitstream from individual components (selecting an appropriate quality version of the downmix waveform data 606 and appending it with metadata 606 and possibly up-mix parameters 608). FIG. 7B illustrates how a modified bitstream may be generated by selecting appropriate waveform data 707 from a super-set of waveform data 607.

Benefits may be achieved by using or by emulating layered coding in a coding scheme that has not been designed to be layered. Layered coding may be emulated by replacing a portion of syntax of a bitstream that will not be used by a decoder for reconstructing signals with a dummy payload that still facilitates decoding, but that is more efficient to transmit. This may be useful, for example if the deployed decoders require all the components of the bitstream to be received, in order to enable decoding. Transcoding may be performed by parsing the bitstreams and by replacing sections of the bitstream that will not be used with dummy payloads. As a result of this, the decoder is provided with all the required components of a bitstream in a bit-rate efficient manner.

It should be noted that the object-based format and the above mentioned schemes may also be used when transmitting channel-based content (i.e., beds, objects with static metadata). In this case, the positional metadata 606, 601 payloads may be trivial, but the open-loop property of the coding scheme for object-based content may be used to facilitate light weight transcoding, by replacing the up-mix parameters 608 with a dummy payload 713 and enabling reconstruction directly from the downmix.

The open-loop construction of the syntax for coded object-based representation may facilitate more efficient caching. In particular, in a content distribution network 100, where a shield cache is used in an event of a cache miss (to offload the originator of the content), the shield cache may provide a reduced quality version of the requested content (for example, by providing only the downmix object representation and by replacing the up-mix representation with a dummy payload 713). This reduces the cost of transmission and may facilitate an accelerated player startup and an accelerated buildup of the playout buffer of the client player. At the same time the caching node may request the full representation of the content from the origin server. There may be an (almost) seamless switch from the downmix based reconstruction to the up-mix based reconstruction.

Figure 8:
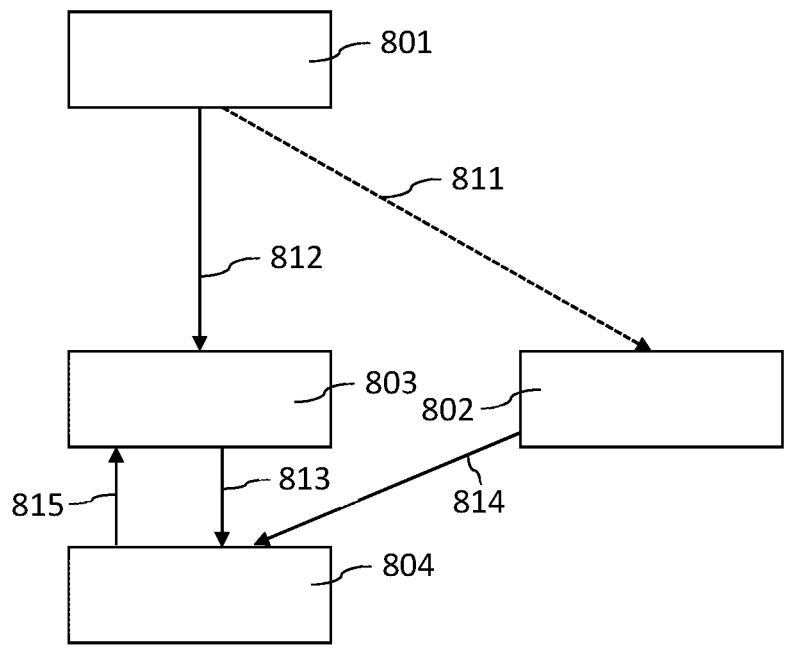
FIG. 8 shows an example scheme for providing content via a shield cache.

The caching of content is illustrated in FIG. 8. The origin server 801 (e.g. the encoder 102) may provide transformed content 812, 103 to a storage unit 111, 803. A high quality representation of the content may be requested (message 815) by and provided (bitstream 813) to a client 804, 104. The content 811, 103 may also be provided to a shield cache 802 (e.g. offline). The shield cage 802 may be configured to provide a downmixed representation of the content (bitstream 814) to the client 804, 104 (e.g. in case of technical problem of the storage unit 111, 803).

In the following different example transcoding applications that may benefit from network-distributed audio and video encoding are described. The applications all involve delivery of ABR (adaptive bitrate) media (e.g. audio and/or video), where media content is provided in several different representations. The representations may differ in terms of resolution, frame rate, bitrate, as well as codec profile/level. The representations may also differ in terms of colour space, chroma subsampling format, dynamic range, codec and streaming formats.

Figure 3:
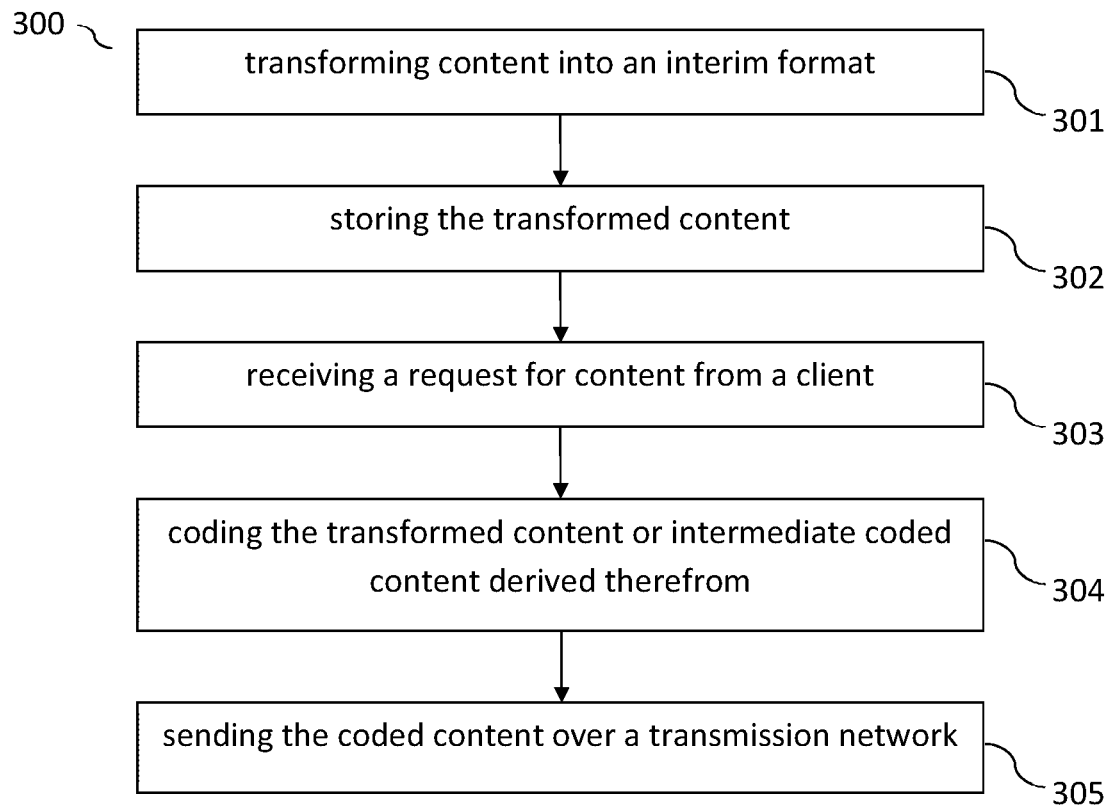
FIG. 3 shows a flow chart of an example method for providing media content within a media distribution network.

FIG. 3 shows a flow chart of an example method 300 for providing media content within a media distribution network 100. The method 300 may comprise method steps of method 200 described in the context of FIG. 2. The method 300 may be performed by one or more components of the distribution network 100, e.g. by one or more encoders 102, 112, 122, 132 of the distribution network 100. The media distribution network 100 comprises a core network 110 with at least one core storage unit 111. Furthermore, the distribution network 100 may comprise at least one edge network 120, 130 which is coupled directly or indirectly to one or more clients 104. Media content may be provided in form of a bitstream from a component of the distribution network 100 (e.g. from one or more encoders 102, 112, 122, 132) via the at least one edge network 120, 130 to the one or more clients 104. Example clients 104 are televisions, smartphones, computers, tablet PCs, audio and/video rendering devices, etc. Example edge networks 120, 130 include MVPD, broadband, mobile/cellular networks, a network provided by an Internet Service Provider (ISP), etc. The media distribution network may be configured to only distribute media (notably voice and/or video content). Preferably, the media distribution network may be configured to transmit media and other forms of data (such as the internet or a managed network operated by a telecommunication operator or a broadband provider).

The method 300 may comprise transforming 301 source media content 105 into an interim format, thereby providing transformed content 103. The source media content 105 may e.g. be PCM encoded audio data, uncompressed digital video data or both. The transformed content 103 in the interim format may comprise a time-frequency representation of the source media content 105. In particular, the transformed content 103 in the interim format may comprise coefficients of a time-frequency transformation, notably MDCT or QMF coefficients, of the source media content 105.

Furthermore, the method 300 may comprise storing 302 the transformed content 103 on at least one core and/or edge storage unit 111, 121, 131. Hence, instead of (or in addition to) storing the source media content 105, the transformed content 103 (or an intermediate coded content 113 derived therefrom) may be stored on one or more storage units 111 within the distribution network 100. As a result, access to content that can be efficiently personalized may be distributed across multiple cloud-based infrastructures enabling multi-source downloads, automatic failure recovery, distributed congestion avoidance, etc. Furthermore, the transformed content 103 may be stored on one or more storage units 111, 121, 131 within the distribution network 100 independent of a particular request from the source media content 105.

The method 300 may further comprise receiving 303 a request for the source media content 105 from a client 104. For this purpose, a message may be received from the client 104 via a backward communication channel of the distribution network 100. The message may be received at a component, notably at an encoder 102, 112, 122, 132 of the distribution network 100.

In addition, the method 300 may comprise (notably in reaction to receiving 303 the request from the client 104) encoding 304 the transformed content 103 or intermediate coded content 113 derived therefrom into encoded content 123, 133 suitable for transmission over the edge network 120, 130. It should be noted that the intermediate coded content 113 may be made available in different versions with different personalization options. Hence, the actual and/or complete encoding of the source media content 105 may only be completed in reaction to a specific request from at least one client 104. The encoded content 123, 133 may then be sent 305 via the edge network 120, 130 to the client 104.

The multiple-step media provision approach described in this document enables an efficient and flexible provision of source media content 105 to different clients 104. In particular, the complexity for media provision may be reduced by storing the source media content 105 as transformed content 105 in a joint interim format which is applicable for a plurality of different clients 104 and/or edge networks 120, 130. The partially encoded transformed content 105 may then be encoded 304 specifically adapted in accordance to the requirements of a client 104 and/or an edge network 120, 130, thereby enabling a flexible provision of source media content 105.

The interim format may be such that the computational complexity for generating the encoded content 123, 133 based on the transformed content 103 and/or based on the intermediate coded content 113 is reduced compared to the computational complexity for generating the encoded content 123, 133 directly from the source media content 105. Alternatively or in addition, the interim format may be such that the amount of memory required for storing the transformed content 103 and/or the intermediate coded content 113 is equal to or preferably lower than the amount of memory required for storing the source media content 105 in a manner used to support adaptive bitrate (ABR) applications. Alternatively or in addition, the interim format may enable a distributed storage of the transformed content 103 on a plurality of core storage units 111 and/or a sequential provision of the transformed content 103 to a client 104. Hence, the interim format may enable an efficient and flexible media distribution.

The method 300 may further comprise performing network coding, notably random linear network coding (RLNC), on at least some of (or all) the transformed content 105 and/or the intermediate coded content 113, prior to storing 303 the transformed content 105 and/or the intermediate coded content 113 on the core and/or edge storage unit 111, 121, 131 and/or prior to encoding 304 the transformed content 103 and/or the intermediate coded content 113. Network coding may comprise adding redundancy to the transformed content 103 or to the intermediate coded content 113. By using network coding, the robustness and efficiency of media distribution may be increased further.

Encoding 304 the transformed content 103 and/or the intermediate coded content 113 and/or the encoded content 123, 133 may comprise: applying a time and/or frequency masking curve to the transformed content 103 and/or the intermediate coded content 113; and/or quantizing coefficients comprised within the transformed content 103 and/or the intermediate coded content 113; and/or allocating bits to different components of the transformed content 103 and/or the intermediate coded content 113; and/or setting a sampling rate for the encoded content 123, 133; and/or downmixing a number of channels comprised within the transformed content 103 and/or the intermediate coded content 113; and/or generating a bitstream based on the transformed content 103 and/or the intermediate coded content 113; and/or removing ancillary content/substreams such as alternate languages from the transformed content 103 and/or the intermediate coded content 113.

It should be noted that a network 100 may comprise multiple layers of core networks 110. Furthermore, it should be noted that transformed content 103 and/or intermediate coded content 113 may be re-encoded multiple times, in order to adapt the content to particular requirements of a network 110, 120, 130 and/or of a client 104. Hence, multiple (notably 2, 3, 4, 5 or more) levels of (partially) coded content 103, 113, 123, 133 may be provided within the network 100. In particular, there may be multiple different versions of intermediate coded content 113 (e.g. for different edge networks 120, 130 and/or for different types of clients 104). Hence, the original content 105 may be transformed/encoded into transformed content 103. The transformed content 103 may be encoded into different versions and/or levels of intermediate coded content 113 (e.g. for different clients 104 and/or for different edge networks 120, 130). Eventually, a version of the intermediate coded content 113 may be encoded into the encoded content 123, 133 which is sent to a client 104. The decoding of the encoded content 123, 133 may be performed in a decoder 124, 134 at a network edge and/or at the client 104.

The method 300 may comprise receiving feedback data 106, 116 from the client 104, from a rendering environment of the client 104 and/or from any component within the delivery network 100. The transformed content 103 and/or the intermediate coded content 113 and/or the encoded content 123, 133 may then be encoded based on the feedback data 106, 116. Encoding 304 the transformed content 103 and/or the intermediate coded content 113 and/or the encoded content 123, 133 may then comprise: adapting a masking curve based on the feedback data 106, 116; and/or adapting a quantization size or level based on the feedback data 106, 116; and/or adapting a bit allocation scheme based on the feedback data 106, 116; and/or adjusting a sampling rate for encoding the transformed content 103 and/or the intermediate coded content 113 and/or the encoded content 123, 133 based on the feedback data 106, 116; and/or removing ancillary content/substreams such as alternate languages that will not be used based on feedback 106, 116. By taking into account feedback data 106, 116, the efficiency and the flexibility of media distribution may be increased further.

The feedback data 106, 116 may comprise information regarding a characteristic and/or a condition of the delivery network 100. Example feedback data 106, 116 comprises: information regarding a transmission delay and/or latency of the delivery network 100; and/or information regarding an available bandwidth of the delivery network 100; and/or information regarding a hop count between the core storage unit 111 and the client 104; and/or information regarding a transmission reliably and/or a packet loss rate of the delivery network 100; and/or information regarding a network policy and configuration which is applied within the delivery network 100; and/or information regarding traffic or processing load of network encoders 112, 122, 132 within the delivery network 100; and/or information regarding congestion and/or capacity constraints within the delivery network 100; and/or information regarding storage 111, 121, 131 availability within the delivery network 100; and/or information regarding transformed content 103, 113, 123, 133 availability/status within the delivery network 100.

Alternatively or in addition, the feedback data 106, 116 may comprise information regarding a characteristic and/or a condition of the client 104. Example feedback data 106, 116 comprises: information regarding a coding scheme supported by the client 104; and/or information regarding a rendering scheme supported by the client 104; and/or information regarding a number of audio and/or video rendering transducers and/or devices of the client 104; and/or information regarding a frequency response of a transducer of the client 104; and/or information regarding a capturing capability, notably regarding a microphone, of the client 104; and/or information regarding a position of the client 104; and/or information regarding a rendering mode of the client 104 (e.g. mono or stereo rendering).

Alternatively or in addition, the feedback data 106, 116 comprises information regarding a characteristic and/or a condition of the rendering environment of the client 104. Example feedback data 106, 116 comprises: information regarding a noise level and/or a noise characteristic and/or a noise spectrum within the rendering environment; and/or information regarding brightness and/or light conditions within the rendering environment; and/or information regarding biodata, emotional data and/or preferences of a user of the client 104; and/or information regarding an orientation of a user of the client 104 with regards to one or more rendering transducers of the client 104.

The client 104 may comprise one or more sensors 107 and/or a collection of one or more sensors 107 within the rendering environment configured to provide sensor data regarding the rendering environment of the client 104, wherein the one or more sensors may comprise a light sensor and/or an acoustic sensor and/or a biosensor. The feedback data 106, 116 may then comprise and/or may then be based on the sensor data. By providing sensor data as feedback to a component, e.g. to an encoder 102, 112, 122, 132, of the distribution network 100, the flexibility and the efficiency of media distribution may be further increased.

The feedback data 106, 116 may comprise transient and/or fixed information regarding the client 104, the rendering environment of the client 104 and/or the delivery network 100. Fixed information may be used to partially encode the transformed content 103 to intermediate coded content 113 and/or to encoded content 123, 133 which may be stored (e.g. for transmission within a particular edge network 120, 130 and/or for transmission to a particular group of clients 104). Transient information may be used to (continuously) adapt the encoding of the transformed content 103 and/or the intermediate coded content 113 and/or the encoded content 123, 133. By taking into account transient and/or fixed feedback information, the flexibility and the efficiency of media distribution may be further increased.

The method 300 may comprise, repeatedly, notably periodically, receiving updated feedback data 106, 116 (e.g. comprising transient feedback information). The encoding 304 of the transformed content 103 and/or of the intermediate coded content 113 and/or of the encoded content 123, 133 may then be adapted repeatedly, notably periodically, based on the updated feedback data 106, 116, thereby increasing the quality of service and/or the quality of experiences of the media distribution scheme.

The method 300 may comprise receiving multicast feedback data 106, 116 regarding a plurality of clients 104 which have requested or which may request the source media content 105. The transformed content 103 or the intermediate coded content 113 and/or the encoded content 123, 133 may then be at least partially encoded based on the multicast feedback data 106, 116, to provide joint, at least partially encoded, content for the plurality of clients 104. Hence, multicast media distribution to a plurality of clients 104 and/or via a plurality of different edge networks 120, 130 may be enabled in an efficient and flexible manner.

The media distribution network 100 may comprise a first edge network 120 having a first characteristic (e.g. a first bandwidth restriction) and a second edge network 130 having a second characteristic (e.g. a second bandwidth restriction). The first and/or second characteristics may be inherent and/or fixed characteristics of the first and second edge network 120, 130, respectively. By way of example, the first and/or second characteristics may comprise a delay, a latency, a packet loss rate, a bandwidth and/or a characteristic of a physical layer of the edge network 120, 130.

The method 300 may comprise encoding the transformed content 105 into first intermediate coded content 113 in dependence of the first characteristic for transmission via the first edge network 120. The first edge network 120 may comprise a collection of one or more first edge storage units 121, and the first intermediate coded content 113 may be stored on one or more first edge storage units 121. Furthermore, the method 300 may comprise encoding the transformed content 105 into second intermediate coded content 113 in dependence of the second characteristic for transmission via the second edge network 130. The second transmission network 130 may comprise a collection of one/or more second edge storage units 131, and the second intermediate coded content 113 may be stored on one or more second edge storage units 121. Hence, partially pre-encoded intermediate coded content 113 may be provided for different edge networks 120, 130 having one or more different (fixed or inherent) network characteristics. The encoding of the intermediate coded content 113 into encoded content 123, 133 may then be performed based on transient feedback data 106, 116. By doing this, the efficiency of media distribution may be increased further.

Alternatively or in addition, the method 300 may comprise receiving feedback data 106 regarding an inherent and/or fixed condition and/or characteristic of the client 104 and/or of the rendering environment of the client 104. The transformed content 103 may then be encoded into intermediate coded content 113 based on the (fixed) feedback data 106. Furthermore, the intermediate coded content 113 may be stored on one or more core storage units 111 and/or on one or more edge storage units 121, 131 of the edge network 120, 130. The encoding of the intermediate coded content 113 into encoded content 123, 133 may then be performed based on transient feedback data 106, 116. By doing this, the efficiency of media distribution may be increased further. As already indicated above, the original content 105 may be encoded at an arbitrary number of levels (e.g. 3, 4, 5, 6 or more levels).

The method 300 may comprise at least partially decoding the encoded content 123, 133 using a decoding unit 124, 134 of the media distribution network 100 to provide at least partially decoded content. The at least partially decoded content may then be sent to the client 104. By doing this, the resource requirements of a client 104 can be reduced and/or the partially decoded content can be delivered to the client 104 in a format that the client 104 can ingest.

The transformed content 103 may comprise transcode metadata for guiding the encoding 304 of the transformed content 103. In particular, the transcode metadata may be directed at reducing the latency and/or the complexity for encoding 304 the transformed content 103. The transcode metadata may be indicative of the complexity (with regards to the informational content) and/or the entropy for encoding a segment or a frame of the transformed content 103. Alternatively or in addition, the transcode metadata may be indicative of a utility function for the quality of the encoded content 123, 133 as a function of bit-rate. Alternatively or in addition, the transcode metadata may be indicative of a quantization step size and/or a frequency dependent noise allocation as a function of bit-rate. The encoded content 123, 133 may then be encoded based on the transcode metadata. As a result of this, the latency and/or the computational complexity of encoding 304 may be reduced.

The method 300 may comprise receiving feedback data 106, 116 from the client 104, notably feedback data 106, 116 which is indicative of a buffer level of the client 104 for buffering the encoded content 123, 133 for playback. Alternatively or in addition, the method 300 may comprise determining an indication of an available bandwidth based on messages exchanged by a transfer protocol for sending 305 the encoded content 123, 133 to the client 104 (notably based on acknowledgment messages).

A (target) bit-rate for the encoded content 123, 133 may then be determined based on the transcode metadata, based on the feedback data 106, 116 and/or based on the indication of the available bandwidth. In particular, the (target) bit-rate may be determined such that a target cost function which is dependent on the buffer drift, on the quality of the encoded content 123, 133 and/or the probability of buffer over- and/or underflow is improved, notably optimized. By doing this, the available bandwidth on a transmission link between the encoder 112, 122, 132 and the client 104 may be used in an optimal manner.

The media content may comprise audio, notably channel-based audio and/or object-based audio. The transformed content 103 may comprise parametric data for generating different numbers of audio objects and/or different numbers of audio channels for the audio. The encoded content 123, 133 may be encoded based on the parametric data. In particular, a target bit-rate for the audio within the encoded content 123, 133 may be determined and an appropriate set of parametric data for determining the encoded content 123, 133 may be selected from the parametric data within the transformed content 103. The selection may be performed in dependence of the target bit-rate. By doing this, encoding 304 of the transformed content 103 may be performed in an efficient manner.

The method 300 may comprise receiving feedback data 106, 116 indicating a relatively low transmission stability of the distribution network 100. In reaction to this, the number of independently encoded frames, notably of I frames, within the encoded content 123, 133 may be increased, thereby increasing the quality of the encoded content 123, 133 which is received by the client 104.

The transformed content 103 may comprise high frequency reconstruction data for a relatively broad frequency range. The high frequency reconstruction data may enable a decoder to generate a high frequency portion of the audio (e.g. of an audio signal or an audio channel) based on a low frequency portion of the audio. The high frequency reconstruction data may be provided starting at a relatively low crossover frequency and going up to a relatively high maximum frequency.

The method 300 may comprise deriving high frequency reconstruction data for a relatively narrow frequency range from the high frequency reconstruction data for the relatively broad frequency range, in order to determine the encoded content. In particular, the high frequency reconstruction data for the relatively narrow frequency range may only start at an increased crossover frequency and/or only go up to a reduced maximum frequency.

The high frequency reconstruction data for the relatively broad frequency range may comprise envelope data for an envelope of the high frequency portion of the audio. The transformed content 103 may comprise envelope data at a relatively high frequency resolution and/or time resolution. The method 300 may comprise deriving envelope data at a relatively low frequency resolution and/or time resolution from the envelope data at a relatively high frequency resolution and/or time resolution.

By providing high frequency reconstruction data for a relatively broad frequency range, the complexity and latency of transcoding to audio signals with various different bit-rates may be reduced.

The source media content 105 may comprise N audio objects. Transforming 302 the source media content 105 may comprise downmixing the N audio objects to provide M audio objects, with M<N. Furthermore, up-mix metadata 608 for reconstructing the N audio objects from the M audio objects may be determined. The M audio objects and the up-mix metadata 608 may then be inserted into the transformed content 103. An audio object typically comprises waveform data and positional metadata. The transformed content 103 may also comprise the positional metadata 601 for the N audio objects. As a result of this, an encoder 112, 122, 132 may be enabled to provide a reconstruction of the N audio objects or a reconstruction of a reduced number of M audio objects in an efficient manner.

In particular, encoding 304 the transformed content 103 may comprise removing the up-mix metadata 608 or replacing the up-mix metadata 608 by dummy metadata 713. As a result of this, a downmixed audio stream may be provided at an encoder 112, 122, 132 in an efficient manner.

As indicated above, the transformed content 105 may comprise M audio objects (which are possibly downmixed versions of a higher number of N audio objects). At least one of the M audio objects may comprise or may be an emphasis object (e.g. a dialogue object comprising a dialogue or speech signal) which may be of particular importance to a listener.

The method may comprise receiving feedback data 106 which is indicative of whether enhancement of emphasis objects (e.g. dialogue enhancement) is used by the client 104 or not. Encoding 304 the transformed content 103 may comprise downmixing the M audio objects in dependence of whether enhancement of emphasis objects (e.g. dialogue enhancement) is used or not. By way of example, if enhancement of emphasis objects is used, the emphasis object may be amplified prior to downmixing. By doing this, a high quality user experience may be provided in an efficient manner.

As indicated above, the transformed content 105 may comprise M audio objects. The method 300 may comprise receiving feedback data 106 indicating that the client 104 only supports channel-based audio rendering. In reaction to this, encoding 304 the transformed content 103 may comprise transforming the M audio objects into one or more audio channels. By doing this, audio content may be provided to a client 104 in an efficient and appropriate manner.

The transformed content 105 may comprise for at least one of the M audio objects waveform data 607 for different bit-rates. In this case, encoding 304 the transformed content 103 may comprise selecting waveform data 607 for a target bit-rate. By providing waveform data 607 for different bit-rates, an efficient transcoding to different bit-rates may be enabled.

Furthermore, a system for a media distribution network 100 is described. The system may comprise one or more computing devices (e.g. servers) within the media distribution network 100. In particular, the system may comprise one or more encoders 102, 112, 122, 132.

The system is configured to transform source media content 105 into an interim format, thereby providing transformed content 103. Furthermore, the system is configured to store the transformed content 103 on at least one core storage unit 111. In addition, the system is configured to receive a request for the source media content 105 from a client 104. The system is further configured to encode the transformed content 103 or intermediate coded content 113 derived therefrom into encoded content 123, 133 suitable for transmission over the edge network 120, 130, and to send the encoded content 123, 133 via the edge network 120, 130 to the client 104.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

We claim:

1. A method for providing media content within a media distribution network; wherein the media distribution network comprises a core network with at least one core storage unit, a first edge network coupled to one or more first clients, and a second edge network coupled to one or more second clients; wherein the method comprises transforming source media content into an interim format, thereby providing transformed content;

storing the transformed content on the at least one core storage unit;

receiving a request for the source media content from a client;

encoding the transformed content into first intermediate coded content in dependence of a first characteristic of the first edge network;

encoding the transformed content into second intermediate coded content in dependence of a second characteristic of the second edge network, wherein the second characteristic is different than the first characteristic, and wherein the second intermediate coded content is encoded differently than the first intermediate coded content;

receiving feedback data at least one of from the client, from a rendering environment of the client, and from one or more components within the distribution network, wherein the transformed content is further encoded based on the feedback data;

sending the first intermediate coded content via the core network to the first edge network; and sending the second intermediate coded content via the core network to the second edge network.

2. The method of claim 1, wherein the interim format is such that a first computational complexity for generating encoded content based on one of the first intermediate coded content and the second intermediate coded content is reduced compared to a second computational complexity for-generating the encoded content directly from the source media content.

3. The method of claim 1, wherein the interim format is such that an amount of memory required for storing at least one of the transformed content, the first intermediate coded content, and the second intermediate coded content is equal to or lower than an amount of memory required for storing the source media content in a plurality of versions and permutations required for adaptive bit rate.

4. The method of claim 1, wherein the interim format enables at least one of:

a distributed storage of the transformed content on a plurality of core storage units;

a distributed storage of the transformed content on a plurality of edge storage units; and a sequential provision of the transformed content to the client.

5. The method of claim 1, wherein the method further comprises performing network coding on at least some of the transformed content prior to at least one of (i) storing the transformed content on the at least one of the core storage unit and (ii) encoding the transformed content.

6. The method of claim 1, wherein encoding the transformed content comprises at least one of:

applying at least one of a time masking curve and a frequency masking curve to the transformed content;

quantizing coefficients comprised within the transformed content;

allocating bits to different components of the transformed content;

setting a sampling rate for encoded content generated by encoding one of the first intermediate coded content and the second intermediate coded content;

downmixing a number of channels comprised within the transformed content; and generating a bitstream based on the transformed content.

7. The method of claim 1, wherein at least one of the transformed content in the interim format comprises a time-frequency representation of the source media content; and the transformed content in the interim format comprises coefficients of a time-frequency transformation of the source media content.

8. The method of claim 1, wherein encoding the transformed content comprises at least one of adapting a masking curve based on the feedback data;

adapting a quantization size based on the feedback data;

adapting a bit allocation scheme based on the feedback data;

adjusting a sampling rate for encoding the transformed content based on the feedback data; and adapting at least one of a playback profile and a configuration based on the feedback data.

9. The method of claim 1, wherein the feedback data comprises at least one of the first characteristic of the first edge network and the second characteristic of the second edge network, wherein the at least one of the first characteristic of the first edge network and the second characteristic of the second edge network includes information regarding at least one of a characteristic and a condition of at least one of the first edge network and the second edge network;

information regarding at least one of a transmission delay and a latency of at least one of the first edge network and the second edge network;

information regarding an available bandwidth of at least one of the first edge network and the second edge network;

information regarding a hop count between the core storage unit and the client;

information regarding at least one of a transmission reliability and a packet loss rate of at least one of the first edge network and the second edge network; and information regarding a network policy which is applied within at least one of the first edge network and the second edge network.

10. The method of claim 1, wherein the feedback data comprises at least one of:

information regarding at least one of a characteristic and a condition of the client;

information regarding a coding scheme supported by the client;

information regarding a rendering scheme supported by the client;

information regarding a number of at least one of audio rendering transducers and video rendering transducers of the client;

information regarding a frequency response of a transducer of the client;

information regarding a capturing capability of the client;

information regarding a position of the client; and information regarding a rendering mode of the client.

11. The method of claim 1, wherein the feedback data comprises at least one of:

information regarding at least one of a characteristic and a condition of the rendering environment of the client;

information regarding at least one of a noise level, a noise characteristic, and a noise spectrum within the rendering environment;

information regarding at least one of a brightness and light conditions within the rendering environment;

information regarding at least one of biodata, emotional data, and preferences of a user of the client; and information regarding an orientation of the user of the client with regards to one or more rendering transducers of the client.

12. The method of claim 1, wherein
the client comprises one or more sensors configured to provide sensor data regarding the rendering environment of the client;
the one or more sensors comprises at least one of a light sensor, an acoustic sensor, and a biosensor; and
the feedback data at least one of comprises the sensor data and is based on the sensor data.

13. The method of claim 1, wherein the feedback data comprises at least one of transient information and fixed information regarding at least one of the client, the rendering environment of the client, the first edge network and the second edge network.

14. The method of claim 1, wherein the method comprises:
repeatedly receiving updated feedback data; and
repeatedly adapting the encoding of the transformed content based on the updated feedback data.

15. The method of claim 1, wherein
the method comprises receiving multicast feedback data regarding a plurality of clients which have requested the source media content; and
the transformed content is at least partially encoded based on the multicast feedback data, to provide joint at least partially encoded content for the plurality of clients.

16. The method of claim 1, further comprising:
encoding the first intermediate coded content into first encoded content suitable for transmission over the first edge network; and
sending the first encoded content via the first edge network to at least one of the one or more first clients.

17. The method of claim 1, wherein
the first edge network comprises a first edge storage unit;
the second edge network comprises a second edge storage unit;
the method comprises storing the first intermediate coded content on the first edge storage unit; and
the method comprises storing the second intermediate coded content on the second edge storage unit.

18. The method of claim 1, wherein at least one of
the first characteristic and the second characteristic is each at least one of an inherent characteristic and a fixed characteristic of the first edge network and the second edge network, respectively; and
at least one of the first characteristic and the second characteristic comprise at least one of a delay, a latency, a packet loss rate, and a characteristic of a physical layer of a respective edge network.

19. The method of claim 1, wherein the
feedback data includes at least one of an inherent condition, a fixed condition, and a characteristic of the client;
encoding the transformed content into at least one of the first intermediate coded content and the second intermediate coded content based on the feedback data; and
storing the at least one of the first intermediate coded content and the second intermediate coded content on at least one of the core storage unit and an edge storage unit of a respective edge network.

20. The method of claim 1, wherein the method comprises
at least partially decoding encoded content generated by encoding one of the first intermediate coded content and the second intermediate coded content using a decoding unit of the media distribution network to provide at least partially decoded content; and
sending the at least partially decoded content to the client.

21. The method of claim 1, wherein
the transformed content comprises transcode metadata for guiding the encoding of the transformed content; and
encoded content generated by encoding one of the first intermediate coded content and the second intermediate coded content is encoded based on the transcode metadata.

22. The method of claim 21, wherein the transcode metadata is indicative of at least one of:
a complexity for encoding a segment or a frame of the transformed content;
a utility function for a quality of the encoded content as a function of bit-rate;
quantization step size as a function of bit-rate; and
a frequency dependent noise allocation as a function of bit-rate.

23. The method of claim 21, wherein the
feedback data is received from the client, the feedback data indicative of a buffer level of the client;
determining an indication of an available bandwidth based on messages exchanged by a transfer protocol for sending the encoded content; and
determining a bit-rate for the encoded content based on at least one of the transcode metadata, the feedback data, and the indication of the available bandwidth.

24. The method of claim 23, wherein the bit-rate is determined such that a target cost function which is dependent on at least one of a buffer drift, a quality of the encoded content, and a probability of buffer over/underflow is improved.

25. The method of claim 1, wherein
the media content comprises audio;
the transformed content comprises parametric data for covering at least one of a different number of audio objects and a different number of audio channels for the audio; and
the encoded content is encoded based on the parametric data.

26. The method of claim 25, wherein the method comprises,
determining a target bit-rate for the audio; and
selecting parametric data for determining the encoded content in dependence of the target bit-rate.

27. A system for a media distribution network; wherein the media distribution network comprises a core network with at least one core storage unit and at least one edge network coupled to one or more clients; wherein the system is configured to
transform source media content into an interim format, thereby providing transformed content;
store the transformed content on the at least one core storage unit;
encode the transformed content into intermediate coded content in dependence of a respective characteristic of a respective edge network of the at least one edge network, the transformed content suitable for transmission over at least one of the core network and the at least one edge network, wherein the intermediate coded content includes intermediate coded content encoded based on first feedback data at least one of from a respective client, from a rendering environment of the respective client, and from one or more components within the distribution network;

encode the intermediate coded content into respective encoded content suitable for transmission over the respective edge network of the at least one edge network; and provide the respective encoded content via the respective edge network to respective clients of the one or more clients.

* * * * *